United States Patent
Ko et al.

(10) Patent No.: US 9,584,200 B2
(45) Date of Patent: *Feb. 28, 2017

(54) METHOD FOR TRANSMITTING CONTROL INFORMATION IN MULTIPLE ANTENNA SYSTEM

(71) Applicant: LG ELECTRONICS INC., Seoul (KR)

(72) Inventors: Hyun Soo Ko, Seoul (KR); Bin Chul Ihm, Seoul (KR); Jin Young Chun, Seoul (KR); Wook Bong Lee, Seoul (KR); Moon Il Lee, Seoul (KR); Jae Wan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

This patent is subject to a terminal disclaimer.

(21) Appl. No.: 14/679,152

(22) Filed: Apr. 6, 2015

(65) Prior Publication Data

US 2015/0263798 A1 Sep. 17, 2015

Related U.S. Application Data

(63) Continuation of application No. 12/522,373, filed as application No. PCT/KR2008/001403 on Mar. 12, 2008, now Pat. No. 9,025,688.

(Continued)

(30) Foreign Application Priority Data

May 9, 2007 (KR) .................. 10-2007-0045187
Oct. 1, 2007 (KR) .................. 10-2007-0098860

(51) Int. Cl.
*H04W 4/00* (2009.01)
*H04B 7/04* (2006.01)
(Continued)

(52) U.S. Cl.
CPC ......... *H04B 7/0452* (2013.01); *H04B 7/0639* (2013.01); *H04L 5/0023* (2013.01);
(Continued)

(58) Field of Classification Search
CPC .. H04B 7/0452; H04B 7/0639; H04B 5/0023; H04B 5/0051; H04B 27/2601; H04W 72/0406; H04W 72/0453
See application file for complete search history.

(56) References Cited

U.S. PATENT DOCUMENTS 8,300,533 B2 * 10/2012 Malladi ................ H04L 5/0048
370/235
8,982,969 B2 * 3/2015 Kent .................... H04B 7/0632
375/260

(Continued)

FOREIGN PATENT DOCUMENTS

KR 2007-0005883 A 1/2007
WO 2005/125140 A1 12/2005
(Continued)

OTHER PUBLICATIONS

Samsung, "Signaling for support of SU-MIMO in the Downlink," 3GPP TSG RAN WG1 Meeting #48, R1-070947, Feb. 2007, 3 pages.

(Continued)

*Primary Examiner* — Abdelnabi O Musa
(74) *Attorney, Agent, or Firm* — Lee Hong Degerman Kang Waimey

(57) ABSTRACT

A method of transmitting control information includes dividing frequency bandwidth into ranges to which the same PMI (precoding matrix index) is applied, obtaining multiple antenna information by the range to which the same PMI is applied and transmitting the multiple antenna information. Since multiple antenna information is transmitted by the unit (Continued)

of a range to which the same PMI is applied, radio resources allocated for transmitting the multiple antenna information may be reduced, thereby enhancing data transmission efficiency.

18 Claims, 12 Drawing Sheets

Related U.S. Application Data

(60) Provisional application No. 60/894,422, filed on Mar. 12, 2007.

(51) Int. Cl.
| | |
|---|---|
| *H04B 7/06* | (2006.01) |
| *H04L 5/00* | (2006.01) |
| *H04L 27/26* | (2006.01) |
| *H04W 72/04* | (2009.01) |
| *H04B 7/12* | (2006.01) |
| *H04L 25/02* | (2006.01) |

(52) U.S. Cl.
CPC .......... *H04L 5/0051* (2013.01); *H04L 5/0053* (2013.01); *H04L 27/2601* (2013.01); *H04W 72/0406* (2013.01); *H04W 72/0453* (2013.01); *H04B 7/0417* (2013.01); *H04B 7/063* (2013.01); *H04B 7/0634* (2013.01); *H04B 7/12* (2013.01); *H04L 25/0204* (2013.01); *H04L 25/0228* (2013.01)

(56) References Cited

U.S. PATENT DOCUMENTS

| | | | |
|---|---|---|---|
| 2006/0045199 A1* | 3/2006 | Kim | H04L 1/0631 |
| | | | 375/267 |
| 2006/0128309 A1 | 6/2006 | Dateki et al. | |
| 2006/0171483 A1* | 8/2006 | Jia | H04L 1/005 |
| | | | 375/267 |
| 2007/0076677 A1* | 4/2007 | Batariere | H04L 1/0038 |
| | | | 370/342 |
| 2007/0115890 A1* | 5/2007 | Yi | H04W 72/14 |
| | | | 370/331 |
| 2007/0153925 A1 | 7/2007 | Yang | |
| 2007/0189240 A1 | 8/2007 | Cho et al. | |
| 2008/0212701 A1 | 9/2008 | Pan et al. | |
| 2008/0260059 A1 | 10/2008 | Pan | |
| 2008/0273624 A1 | 11/2008 | Kent et al. | |
| 2009/0316675 A1 | 12/2009 | Malladi et al. | |
| 2010/0260115 A1 | 10/2010 | Frederiksen et al. | |
| 2011/0243265 A1* | 10/2011 | Dateki | H04B 7/0613 |
| | | | 375/260 |

FOREIGN PATENT DOCUMENTS

| | | |
|---|---|---|
| WO | 2006/052890 A1 | 5/2006 |
| WO | 2007/021153 A1 | 2/2007 |

OTHER PUBLICATIONS

European Patent Office Application Serial No. 08723440.7, Office Action dated Jan. 19, 2015, 7 pages.
Korean Intellectual Property Office Application Serial No. 10-2007-0098860, Notice of Allowance dated Jan. 28, 2014, 2 pages.
Samsung, "Signaling for support of SU-MIMO in the Downlink", R1-070947, 3GPP TSG RAN WG1 Meeting #48, Feb. 2007, 3 pages.
3rd Generation Partnership Project (3GPP), "Technical Specification Group Radio Access Network; Physical layer aspects for evolved Universal Terrestrial Radio Access (UTRA) (Release 7)", 3GPP TR 25.814, V7.1.0, Sep. 2006, 132 Pages (Relevant pp. 20-45).
European Patent Office Application Serial No. 08723440.7 Search Report dated Mar. 5, 2013, 6 pages.

* cited by examiner

METHOD FOR TRANSMITTING CONTROL INFORMATION IN MULTIPLE ANTENNA SYSTEM

CROSS-REFERENCE TO RELATED APPLICATIONS

This application is a continuation of U.S. patent application Ser. No. 12/522,373, filed on Jul. 7, 2009, now U.S. Pat. No. 9,025,688, which is the National Stage filing under 35 U.S.C. 371 of International Application No. PCT/KR2008/001403, filed on Mar. 12, 2008, which claims the benefit of earlier filing date and right of priority to Korean Application Nos. 10-2007-0098860, filed on Oct. 1, 2007, and 10-2007-0045187, filed on May 9, 2007, and also claims the benefit of U.S. Provisional Application No. 60/894,422, filed on Mar. 12, 2007, the contents of which are hereby incorporated by reference herein in their entirety.

TECHNICAL FIELD

The present invention relates to wireless communication, and more specifically, to a method for transmitting control information related to multiple antenna in a wireless communication system.

BACKGROUND ART

A Multiple-Input Multiple-Output (hereinafter, referred to as MIMO) system refers to a system for improving data transmission and receive efficiency using multiple transmit antenna and multiple receive antenna. The MIMO technique includes spatial diversity and spatial multiplexing. The spatial diversity is a technique for improving transmission reliability by transmitting the same data through multiple transmit antenna. The spatial multiplexing is a technique for transmitting data in a high speed without increasing bandwidth of a system by transmitting different data through multiple transmit antenna. The spatial diversity and the spatial multiplexing may be combination.

Generally, a base station provides services to a plurality of user equipments in one or more cells. The base station schedules and transmits user data for the plurality of user equipments. At this time, the base station also schedules and transmits control information so that the user equipments may find and process the user data. A channel on which the user data is loaded is referred to as a data channel, and a channel on which the control information is loaded is referred to as a control channel. The user equipment decodes the user data on the data channel using the control information on the control channel.

In a MIMO system, control information includes information related to MIMO information and is transfers to to the user equipment on the control channel. The user equipment decodes the user data transmitted through multiple antenna using the control information. For example, the base station modulates the control information in Quadrature-Phase Shift Keying (QPSK), encodes the control information at a coding Rate such as ⅔, and transmits the coded control information. The user equipment blind-detects and decodes the control information using the coding rate ⅔. The blind-detecting technique is a method of decoding given data until the user equipment finds its data when the user equipment does not know whether the data transmitted from the base station is its data. Considering the amount of operation, the blind-detecting technique is allowed when the number of information bits related to MIMO is fixed.

However, the MIMO technique may be modified in a variety of ways to be applied, and the number of information bits related to MIMO information may be diversely changed. So it may be inefficient if radio resources for the MIMO information occupies in amount of maximum number of information bits. For example, when user data is transmitted without applying codebook-based precoding, some of radio resources assigned for a precoding matrix index (PMI) which is one of the MIMO information can be useless.

A method is sought for efficiently transmitting the MIMO information.

DISCLOSURE OF INVENTION

Technical Problem

A method of transmitting control information related to MIMO information in a multiple antenna system is provided.

Technical Solution

According to one aspect of the invention, a method of transmitting control information in a multiple antenna system is provided. The method includes dividing frequency bandwidth into ranges to which the same PMI (precoding matrix index) is applied, obtaining multiple antenna information by the range to which the same PMI is applied and transmitting the multiple antenna information.

Here, the range to which the same PMI is applied may include at least one resource block, and the multiple antenna information may be distributed to at least one resource block.

The multiple antenna information may be transmitted through a dedicated pilot or a dedicated control channel including a plurality of sub-carriers. The dedicated control channel may be arranged in a part of a data region allocated to a user or in a part of a common control channel region for transmitting common control information.

Advantageous Effects

Since multiple antenna information is transmitted by the unit of a range to which the same PMI is applied, radio resources allocated for transmitting the multiple antenna information may be reduced, thereby enhancing data transmission efficiency.

MODE FOR THE INVENTION

The present invention may be applied in a variety of communication systems including a code division multiple access (CDMA) system, wideband CDMA (WCDMA) system, frequency division multiple access (FDMA) system, orthogonal frequency division multiplexing (OFDM)/orthogonal frequency division multiple access (OFDMA) system, and the like. OFDM is a multiple carrier modulation technique for efficiently dividing an overall system bandwidth into a plurality of orthogonal sub-bands. The sub-band can be referred to as a tone, sub-carrier, bin, or the like. Each of the sub-bands is associated with each sub-carrier on which data is modulated.

Hereinafter, in order to describe the present invention as detail as those skilled in the art may easily understand, preferred embodiments of the present invention will be described with reference to the accompanying drawings.

Figure 1:
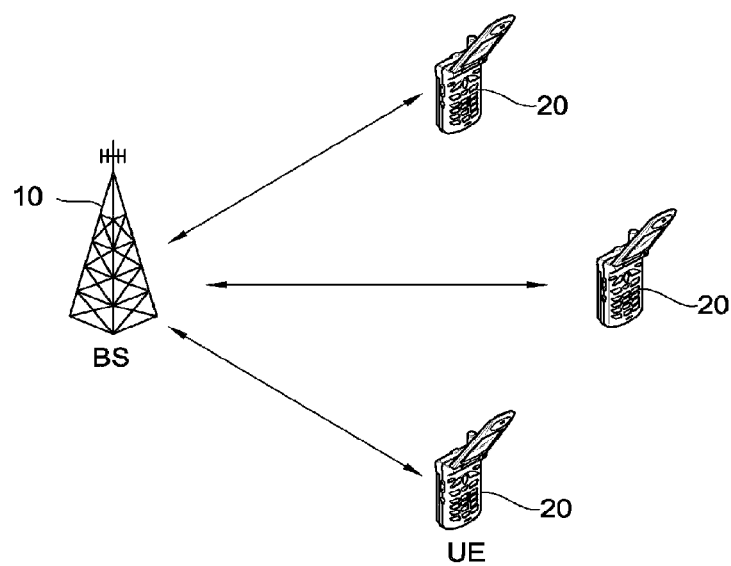
FIG. 1 is an exemplary view showing a wireless communication system.

FIG. 1 is an exemplary view showing a wireless communication system.

Referring to FIG. 1, a wireless communication system comprises a base station (BS) 10 and at least one user equipment (UE) 20. The base station 10 served to one or more cells. The wireless communication system can be widely deployed to provide a variety of communication services, such as voices, packet data, and the like.

Generally, a base station 10 is a fixed station communicating with a user equipment 20, which can be referred to as another terminology, such as a node-B, base transceiver system (BTS), access point, or the like. A user equipment 20 can be fixed or mobile and referred to as another terminology, such as a mobile station (MS), a user terminal (UT), a subscriber station (SS), a wireless device, or the like.

The base station 10 and the user equipment 20 respectively include a transmitter and a receiver.

Hereinafter, downlink means communication from the base station 10 to the user equipment 20, and uplink means communication from the user equipment 20 to the base station 10. In the downlink, a transmitter can be a part of the base station 10, and a receiver can be a part of the user equipment 20. In the uplink, the transmitter can be a part of the user equipment 20, and the receiver can be a part of the base station 10. The base station 10 may include a plurality of receivers and transmitters, and the user equipment 20 may include a plurality of receivers and transmitters.

The communication system may be a multiple-input multiple-output (MIMO) system, multiple-input single-output (MISO) system, single-input single-output (SISO) system, or single-input multiple-output (SIMO). The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality receive antennas.

The MIMO is a technique for increasing the number of antennas to two or more to transmit data in a variety of routes, and a receiver detects signals received through respective routes. The MIMO technique has characteristics of spatial diversity, beamforming, spatial multiplexing, transmit diversity, and the like.

The spatial diversity is used to enhance data reliability by transmitting the same data through different antennas. The spatial diversity may be stably operated when reliability of CQI (Channel Quality Information) fed back from the user equipment is low due to fading effect. When traffics sensitive to a delay are serviced, the spatial diversity may be used as a technique for coping with fading without waiting until channel conditions are getting better. The transmit diversity is a typical technique of spatial diversity, which may be used when a transmitter has a plurality of antennas and does not know channel conditions.

The beamforming is used to raise an SINR (Signal to Inference plus Noise Ratio) of a signal by adding a weight at a multiple antenna depending on channel conditions. The weight may be expressed as a weight matrix, which is referred to as a precoding matrix. The precoding matrix may be directly transferred between the base station and a user, and in addition, a precoding matrix index (hereinafter, referred to as a PMI) may be transmitted between them.

The spatial multiplexing is categorized into spatial multiplexing for a single user and spatial multiplexing for multi-users. The spatial multiplexing for a single user is referred to as single user MIMO (SU-MIMO), and the spatial multiplexing for multi-users is referred to as Spatial Division Multiple Access (SDMA) or multi-user MIMO (MU-MIMO). Capacity of a MIMO channel is increased in proportion to the number of antennas. The MIMO channel may be decomposed into independent channels. When the number of transmit antennas is Nt and the number of receive antennas is Nr, the number of independent channels Ni is Ni≤min{Nt, Nr}. Each of the independent channels may be referred to as a spatial layer. A rank is the number of non-zero eigenvalues of a MIMO channel matrix, which may be defined as the number of spatial streams that can be multiplexed.

The transmit diversity includes an open loop transmit diversity technique and a closed loop transmit diversity technique. The open loop transmit diversity includes time switched transmit diversity (TSTD), orthogonal transmit diversity (OTD), frequency switched transmit diversity (FSTD), and space time transmit diversity (STTD). In TSTD, OTD, and FSTD, data bits to be transmitted are divided into an odd-numbered data row and an even-numbered data row, and the respective rows are transmitted through different antennas. TSTD distinguishes signals transmitted through different antennas by time, OTD distinguishes signals by code, and FSTD distinguishes signals by frequency. STTD is a method that obtains a diversity gain by transmitting signals in a combination of time and space. In the closed loop transmit diversity, a mobile terminal determines a weight multiplied to each antenna and transmits the weight to the base station as feedback information.

Characteristics of the MIMO technique may be applied in combination. A MIMO technique combining the spatial diversity and the spatial multiplexing includes space-frequency block code (SFBC), space-time block code (STBC), cyclic delay diversity (CDD), a technique combining SFBC and CDD, and the like. SFBC is a technique that can secure both a diversity gain and a multi-user scheduling gain at a corresponding dimension by efficiently applying selectivity in the space domain and frequency domain. CDD is a technique that can secure both a diversity gain and a multi-user scheduling gain at a corresponding dimension by efficiently applying selectivity in the time domain and frequency domain. SFBC, CDD, and a technique combining SFBC and CDD may be applied to the transmit diversity technique in an open loop.

In using the MIMO technique, there are a Single Code-Word (SCW) mode for simultaneously transmitting a codeword, i.e., a unit for detecting errors, through a multiple antenna and a Multi CodeWord (MCW) mode for simultaneously transmitting a plurality of codewords through a multiple antenna. Transmission signals have the same data rate in the SCW mode, and transmission signals may have different data rates in the MCW mode since data are independently encoded.

Figure 2:
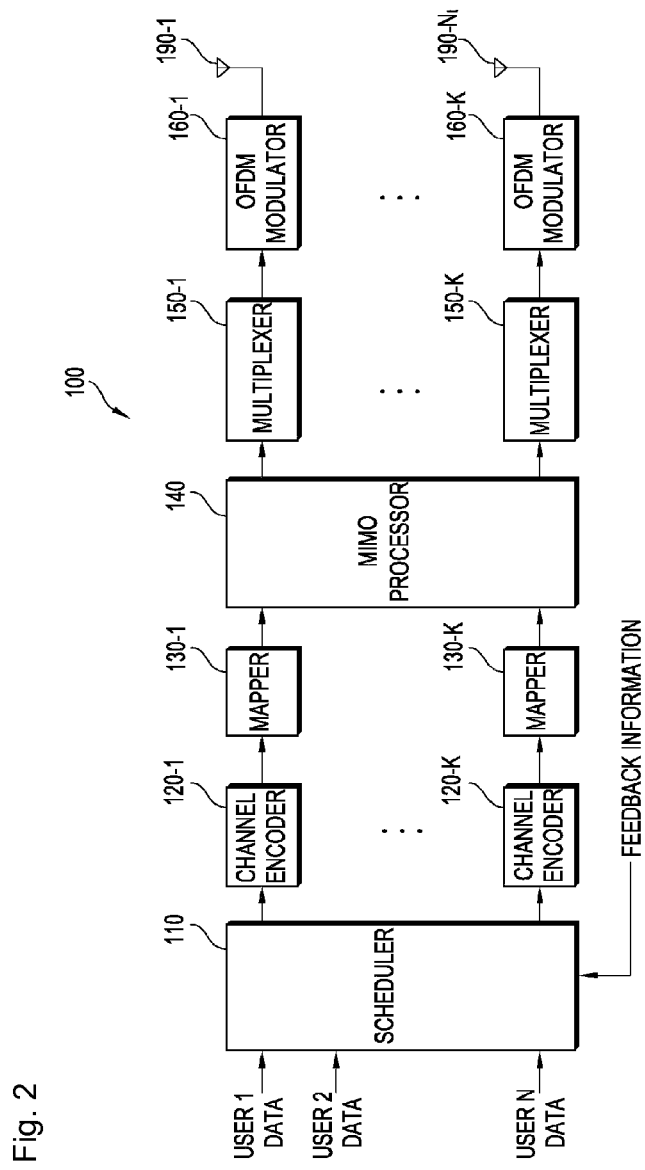
FIG. 2 is a block diagram showing a transmitter according to an embodiment of the invention.

FIG. 2 is a block diagram showing a transmitter according to an embodiment of the invention.

Referring to FIG. 2, a transmitter 100 comprises a scheduler 110, channel encoders 120-1 to 120-K, mappers 130-1 to 130-K, a MIMO processor 140, multiplexers 150-1 to 150-K, and OFDM modulators 160-1 to 160-K. The transmitter 100 also comprises Nt (Nt>1) transmit antennas 190-1 to 190-Nt.

The scheduler 110 receives data for N (N≥1) users and outputs K (K≥1) streams to be transmitted at a time. The scheduler 110 selects a code rate, a modulation and coding scheme (MCS) such as a modulation scheme, and a MIMO method and outputs them to the channel encoders 120-1 to 120-K, the mappers 130-1 to 130-K, and the MIMO processor 140.

Each of the channel encoders 120-1 to 120-K encodes input streams in a predetermined coding scheme and forms coded data. Each of the mappers 130-1 to 130-K maps the coded data to a symbol representing a location on a signal constellation. Any kind of modulation scheme can be used, including m-Phase Shift Keying (m-PSK) and m-Quadrature Amplitude Modulation (m-QAM). For example, the m-PSK can be binary-PSK (BPSK), quadrature-PSK (QPSK), or 8-PSK, and the m-QAM can be 16-QAM, 64-QAM, or 256-QAM.

The MIMO processor 140 processes an input symbol in the MIMO method in accordance with the multiple transmit antennas 190-1 to 190-Nt. For example, the MIMO processor 140 can use codebook-based precoding. The MIMO processor 140 receives a codebook index or a PMI from the scheduler 110 and performs precoding.

Each of the multiplexers 150-1 to 150-K assigns an input symbol to an appropriate sub-carrier and multiplexes input symbols for each user. Each of the OFDM modulators 160-1 to 160-K modulates the input symbols in the OFDM scheme and outputs OFDM symbols. The OFDM modulators 160-1 to 160-K may perform inverse fast Fourier transform (IFFT) on the input symbols and insert a cyclic prefix (CP) in a time domain symbol on which the IFFT is performed. The OFDM symbols are transmitted through each of the transmit antennas 190-1 to 190-Nt.

Figure 3:
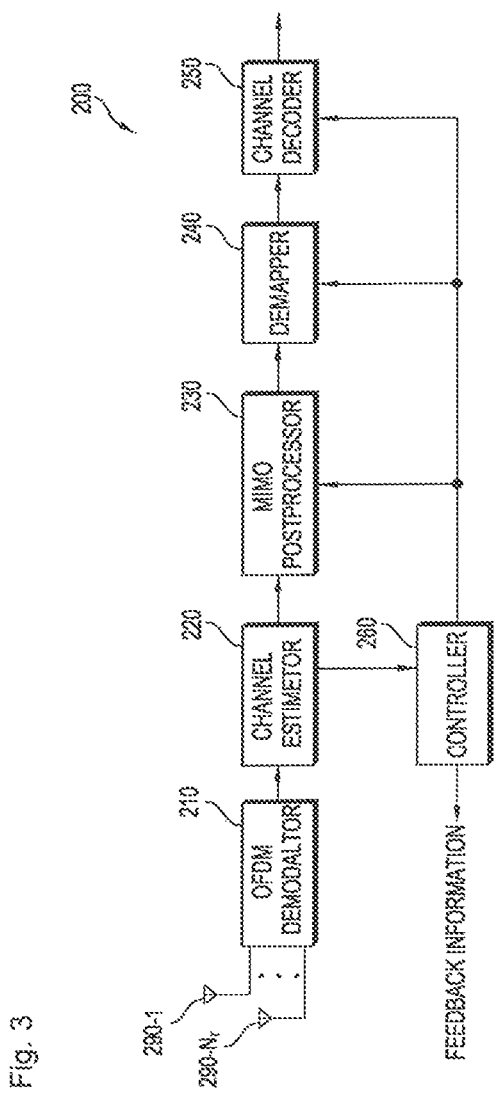
FIG. 3 is a block diagram showing a receiver according to an embodiment of the invention.

FIG. 3 is a block diagram showing a receiver according to an embodiment of the invention.

Referring to FIG. 3, a receiver 200 comprises an OFDM demodulator 210, a channel estimator 220, a MIMO post-processor 230, a demapper 240, a channel decoder 250, and a controller 260.

The OFDM demodulator 210 performs fast Fourier transform (FFT) on signals received from receiving antennas 290-1 to 290-Nr. The channel estimator 220 estimates a channel, and the MIMO post-processor 230 performs a post-process corresponding to the MIMO processor. The demapper 240 demaps input symbols into coded data, and the channel decoder 250 decodes the coded data and restores original data. The controller 260 creates appropriate feedback information and feeds back the created feedback information to the transmitter through the estimated channel or the like. If a Hybrid Automatic Repeat Request (HARQ) method is used, the controller 260 may transmit an ACK (Acknowledgment)/NACK (Non-Acknowledgment) signal depending on whether data is successfully received. In a general HARQ method, the ACK signal means success of receiving data, and the NACK signal means failure of receiving data.

Hereinafter, how to configure control information is disclosed. The control information may be transmitted to downlink direction or uplink direction. Hereinafter, downlink control information is described. All or a part of the downlink control information may be applied to uplink control information in the same manner.

i) Control Information Type

The control information may include broadcast control information, multicast control information, and unicast control information. The broadcast control information is transmitted to all user equipments, the multicast control information is transmitted to a group of specific user equipments, and the unicast control information is transmitted to a specific user equipment. The broadcast control information includes synchronization information between the base station and user equipments, base station identification (ID), initial access information, and the like. The multicast control information includes information needed for restoring data corresponding to a group of specific user equipments. The unicast control information includes information needed for restoring data by a specific user equipment.

An example of the control information is shown in Table 1.

TABLE 1

| | Field | Descriptions |
|---|---|---|
| Category 1(Resource indication) | User equipment ID | Indicate user equipment (or a group of user equipments) performing data transmission |
| | Resource assignment | Indicate resource unit demodulated by user equipment |
| | Duration of assignment | Valid duration of assignment. Used to control TTI or persistent scheduling |
| Category 2(Transport format) | Multiple antenna related information | Contents depending on MIMO/beam-forming method |
| | Modulation scheme | QPSK, 16-QAM, 64-QAM, and the like |
| | Payload size | Information on data size depending on modulation scheme or number of assigned resource units |
| Category 3 (HARQ) | HARQ process number | Indicate HARQ process indicated by current transmission |
| | Redundancy version | Support IR(Incremental Redundancy) |
| | New data indicator | Handle soft buffer clear |

Category 1 for resource indication includes user equipment ID, resource assignment, and duration of assignment fields. The user ID is an identifier for distinguishing each user equipment, and Medium Access Control (MAC) ID, Cell-Radio Network Temporary Identity (C-RNTI), or the like may be used as the user ID. Each user equipment determines whether received control information belongs to the user equipment using the user equipment ID contained in the received control information. The resource assignment is information indicating a resource block assigned to each user equipment, and the user equipment confirms the received resource assignment and knows the position of data assigned to the user equipment in the entire resources. The duration of assignment is information indicating intervals for transmitting control information. Through the duration of assignment, the user equipment may understand TTI intervals at which the control information is transmitted.

Category 2 for transport format includes multiple antenna related information, modulation scheme, and payload size fields. The modulation scheme indicates a modulation scheme used for data of each user equipment among QPSK, 16-QAM, 64-QAM, and the like, and the multiple antenna related information (hereinafter, referred to as MIMO information) indicates information related to use of a multiple antenna. For example, the MIMO information may include Precoding Matrix Index (PMI), Rank Indication (RI), Multi-codebook information, Tracking Codebook information, open loop/closed loop information, SU-MIMO/MU-MIMO information, MIMO mode information, CDD information, multi-user indication (stream indication), and the like.

Category 3 for HARQ (Hybrid Automatic Repeat Request) includes HARQ process number, redundancy version, and new data indicator fields.

Each user equipment may acknowledge the location and size of resources assigned for MIMO information from the control information of category 1, and various kinds of MIMO information from the control information of category 2.

ii) Coding of Control Information

The control information may be coded through joint coding or separate coding. The joint coding is a method of combining a plurality of data and coding the data as a single sequence, and the separate coding is a method of coding each data separately. The joint coding may reduce overheads incurred by control signaling and coding, and has a channel coding gain. The separate coding has an adaptive connection gain such as transmission power control for user equipments having different channel conditions and error rates.

A convolution code may be used for joint coding. The output sequence of the convolution code is determined by past input sequence as well as current input, which is defined as a connection between one or more shift registers and output bits. That is, if the shift registers are k and the output bits are n, the code rate of the convolution code is expressed as k/n. In the joint coding, data may be combined by the user or control information type. For example, control information of a user may be combined and joint coded, or MIMO information of a plurality of users may be combined and joint coded.

A block code or a simplex code may be used for separate coding, and a method of mapping input bits directly to a symbol may also be used. A block code has a length of a fixed codeword. The Reed-Muller block is widely used as the block code. The Reed-Muller block code may effectively reduce an error rate of bits when encoding a small number of bits. For example, three-bit control information may be coded into a Reed-Muller block code and then modulated in QPSK. An example of the Reed-Muller block code is shown in Table 2.

TABLE 2

| Control information(3 bits) | Coding(4 bits) | QPSK modulation |
|---|---|---|
| 000001010011100101110111 | 00001111001111000101101001101001 | [1 +j, 1 +j][−1 −j, −1 −j][1 +j, −1 −j][−1 −j, 1 +j][1 −j, 1 −j][−1 +j, −1 +j][1 −j, −1 +j][−1 +j, 1 −j] |

The Reed-Muller block code is a coding scheme that can effectively reduce bit error probability (BEP) when coding information of a small number of bits. When transmitting a PMI expressed in three bits, the PMI may be transmitted through a coding and modulation process. A receiver of the information may detect information bits through a demodulation and decoding process. Eight symbols that can be expressed by three bits are compared with a received signal, and the most probable bit or transmission bits may be identified. If a Hamming distance of coding bits or a Euclidian distance of a symbol is large, a bit error rate (BER) may be increased, and an appropriate coding scheme is used depending on information bit size.

The simplex code may be created by removing the first row from an orthogonal matrix in which two different row (column) vectors are orthogonal to each other.

A sequence such as a pseudo noise (PN) code, a Constant Amplitude Zero Auto-Correlation (CAZAC) sequence, or the like may be used in a method of mapping input bits directly on symbols. Although the pseudo noise code does not guarantee complete orthogonality, it has a certain characteristic of ignoring interference from other codes and may be used in an environment in which time synchronization may not be obtained. The CAZAC sequence is a sequence that may code and decode data using cyclic shift and auto correlation. Other than these, a variety of sequences may be used for separate coding.

iii) Transmission Intervals of Control Information

The base station may inform user equipments with a PMI whenever the PMI is applied, or periodically or non-periodically, and inform an RI whenever a rank is changed or persistently at control information transmission intervals. The RI may be coded through convolution coding together with control information. Multi-codebook information, tracking codebook information, open loop/closed loop information, SU-MIMO/MU-MIMO information, MIMO mode information, CDD information, multi-user indication, and the like may be informed through network information when a network is connected or the network is changed.

iv) Location of Control Information

The control information described above may be transmitted through a control channel on a sub-frame. A sub-frame may include a plurality of resource blocks (RB). The resource block is a basic unit of radio resources assigned to a user equipment. The resource block may be referred to as a sub-band, sub-channel, resource tile, bin, or the like. A plurality of sub-carriers is assigned to the resource block.

Figure 4:
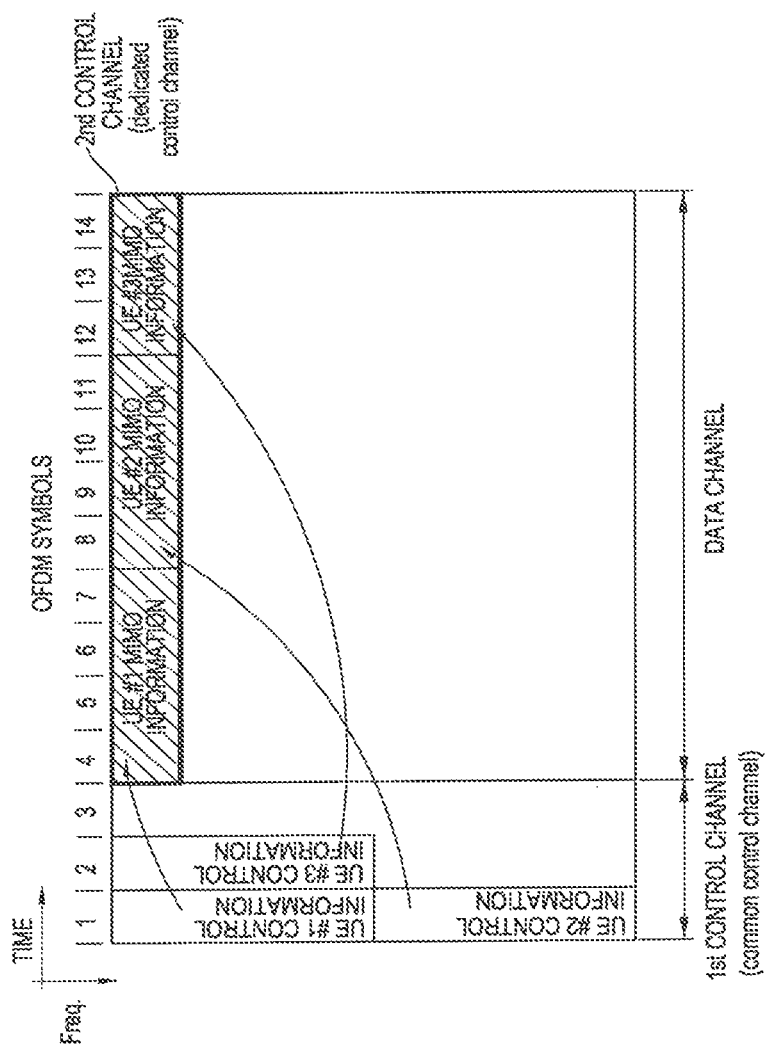
FIG. 4 is a view showing a sub-frame according to an embodiment of the invention.

FIG. 4 is a view showing a sub-frame according to an embodiment of the invention.

Referring to FIG. 4, a OFDM transmitter may transmit data in the unit of a sub-frame. The sub-frame includes a plurality of OFDM symbols and a plurality of sub-carriers. For example, the sub-frame may include fourteen OFDM symbols. Interval to transmit one sub-frame may be called as a transmission time interval (TTI). One TTI may be 1 msec (millisecond). A radio frame may include 10 sub-frames. The fourteen OFDM symbols may be called as a first to fourteenth OFDM symbols. However, this is only an example, and the sub-frame may be diversely modified depending on communication systems. For example, one sub-frame may include 7 OFDM symbols, and a sub-frame has a TTI of 0.5 msec, and a radio frame of 10 msec may include sub-frames. Hereinafter, for the convenience of explanation, it will be described assuming that a sub-frame contains 14 OFDM symbols, and the TTI is 1.0 msec.

A control channel for transmitting control information and a data channel for transmitting data can be allocated on the sub-frame. The control channel includes a first control channel for transmitting common control information and a second control channel for transmitting specific control information. The first control channel is referred to as a common control channel, and the second control channel is referred to as a dedicated control channel used for specific control information. The data and control channels may be composed of one or more OFDM symbols. For example, three OFDM symbols from the first to third OFDM symbols of the sub-frame may be assigned as the first control channel, and the other eleven OFDM symbols from the fourth to fourteenth OFDM symbols may be assigned as the data channel. The second control channel may be arranged at a certain position in the sub-frame. That is, the second control channel may occupy a portion of the data channel (hereinafter, referred to as a data region) or a portion of the first control channel. The second control channel may be located at a fixed or variable position. Here, it is assumed that the second control channel is assigned with a portion of the frequency region of the data channel.

Common control information is loaded on the first control channel, and specific control information is loaded on the second control channel. The common control information may inform information on the second control channel such as existence, location, size and the like of specific control information. For example, common control information of user equipments #1, #2, and #3 is loaded on the first control channel, and the MIMO information of the user equipments #1, #2, and #3 may be loaded on the second control channel. The common control information of user equipment #1 includes information on existence, location, and size of the MIMO information of user equipment #1, the common control information of user equipment #2 includes information on existence, location, and size of the MIMO information of user equipment #2, and the common control information of user equipment #3 includes information on existence, location, and size of the MIMO information of user equipment #3. A user equipment may know MIMO information on the second control channel through the common control information on the first control channel.

The location of MIMO information in the data region may vary in each sub-frame. The MIMO information may be transmitted only once for resource blocks to which the same information is applied or transmitted for each resource block. If the location of MIMO information is variable, a user equipment may identify the location of MIMO information from the control information assigned to the first control channel. However, the location of MIMO information may not be contained in the control information, and in this case, the user equipment may search for the location of MIMO information in a blind detection method.

In the SU-MIMO MCW mode, first stream information may be transmitted through the first control channel, and second stream information may be transmitted through a position assigned in the data channel. When different control information is needed for each resource block assigned to a user equipment, control information used in the current resource block may be transmitted through the second control channel of another resource block. For example, PMI, precoding weight vector, precoding matrix, and the like may be transmitted through the control channel assigned to another resource block.

The first control channel transmits control information used by a specific resource block among assigned resource blocks, and the specific resource block may transmit control information used by still another resource block.

The size of the dedicated control channel used depending on locational geometry may vary. For example, a dedicated control channel of a large size is assigned to a user equipment whose locational geometry is poor to satisfy target detection probability, and a dedicated control channel of a small size is assigned to a user equipment whose locational geometry is favorable. For example, a control channel of a variable size may be assigned depending on a rank or MCS.

On the other hand, the location of MIMO information may be previously assigned within the data region. When the location of MIMO information is previously assigned, information on the location of MIMO information may be contained in the control information. In addition, the location and size of MIMO information may be previously assigned within the data region. In this case, the size of MIMO information may smaller than the assigned region. Like this, when the region assigned to the MIMO information is enough, a pilot signal or channel information signal may be arranged and transmitted.

As described above, a plurality of pieces of MIMO information corresponding to the same user equipment may be coded as a sequence or symbol and placed in the data region. MIMO information for one user equipment may be coded as a sequence or a symbol, or MIMO information for a plurality of user equipments may be coded as a sequence or a symbol. For example, MIMO information for one user equipment or a plurality of user equipments may be coded in convolution coding. On the other hand, a plurality of pieces of MIMO information may be coded in separated coding. For example, MIMO information may be transmitted after being coded in block coding or simplex coding.

In addition, joint coding may be applied to the first control channel, and separate coding may be applied to the second control channel. Alternatively, joint coding may be applied to both of the first and second control channels. Alternatively, separate coding may be applied to the first control channel, and joint coding may be applied to the second control channel. Alternatively, separate coding may be applied to both of the first and second control channels. A coding scheme of the first and second control channels may vary depending on transmitted control information, and the base station may determine a coding scheme and inform the user equipment with the determined coding scheme.

When no control information is loaded on the second control channel, the base station may transmit a transmission signal without using the second control channel. When no control information is loaded on the second control channel, the second control channel may be used for other purposes. For example, the second control channel may be used as a sounding channel for measuring channel conditions of a frequency band in a time division duplex (TDD) system. Alternatively, the second control channel may be used as a dedicated pilot for transmitting PMIs. If the second control channel is not used, the base station should let the user equipment know whether the second control channel is used in a transmission signal. There may be three methods for informing the user equipment with whether the second control channel is used.

First, when a specific transmission technique is used, the base station may use the second control channel without an indicator. For example, in the MIMO technique capable of transmitting two or more streams, in the case of MCW SU-MIMO having a separate modulation and coding scheme (MCS) for each stream, although assigned resource blocks (RB) and applied MIMO methods may be the same, MCS levels and HARQ information of the signals transmitted through respective streams may be different from each other. The MCS level and HARQ information of a first stream may be transmitted through the first control channel, and the MCS level and HARQ information of the other stream may be transmitted through the second control channel. That is, information on the first stream may be transmitted through the first control channel, and information on the other stream may be transmitted through the second control channel. If the user equipment acquires information on the first stream from the first control channel, it may presume without an indicator that information on the other stream is in the second control channel. In this manner, if information on the first stream is transmitted on the first control channel, control signaling may have the same structure as that of the case where information on one stream is transmitted as shown in SCW SU-MIMO, SIMO, or SISO. Accordingly, it is advantageous in that control signaling may be designed consistently. Further, a stream loaded on the first control channel may be selected among a plurality of streams, and since signaling loaded on the first control channel is transmitted at a low MCS level, detection performance may be enhanced. In addition, since the first control channel is distributed in frequency bands based on a resource assignment technique, frequency diversity may be obtained. Since a plurality of antennas is used depending on a transmission technique, antenna diversity may be obtained. Since a sub-band in a favorable channel condition among a plurality of sub-bands may be assigned to signaling information loaded on the second control channel, a scheduling gain may be obtained.

Second, the first control channel may indicate whether the second control channel is used. For example, when precoding weight information applied to the data channel is transmitted through the second channel, the first control channel may inform of whether the second control channel is used. In a single stream transmission such as STC, CDD, FSTD, TSTD, and the like used in open loop transmission, precoding weight information is not needed. However, beamforming, precoding technique, or the like used in closed loop transmission needs precoding weight information. Accordingly, whether the second control channel is used may be indicated by indicating whether the second control channel is used in the first control channel depending on whether it is an open loop or closed loop system. The indicator indicating whether the second control channel is used may be transmitted by the base station to the downlink. Since the base station informs of whether the second control channel is used, the second control channel is allowed to be adaptively used as needed.

Third, whether the second control channel is used is indicated through an indicator that determines an open loop/closed loop transmission mode. The open loop/closed loop transmission mode is changed to semi-static or long-term. Accordingly, information on determining the open loop/closed loop transmission mode is not informed each time through the first control channel. If control information used in a closed loop system, like a precoding weight, is contained in MIMO information, information on determining the closed loop transmission mode may be transmitted through the first control channel. Accordingly, the information on determining the closed loop transmission mode serves as an indicator informing that control information used in the closed loop system is transmitted through the second control channel.

Figure 5:
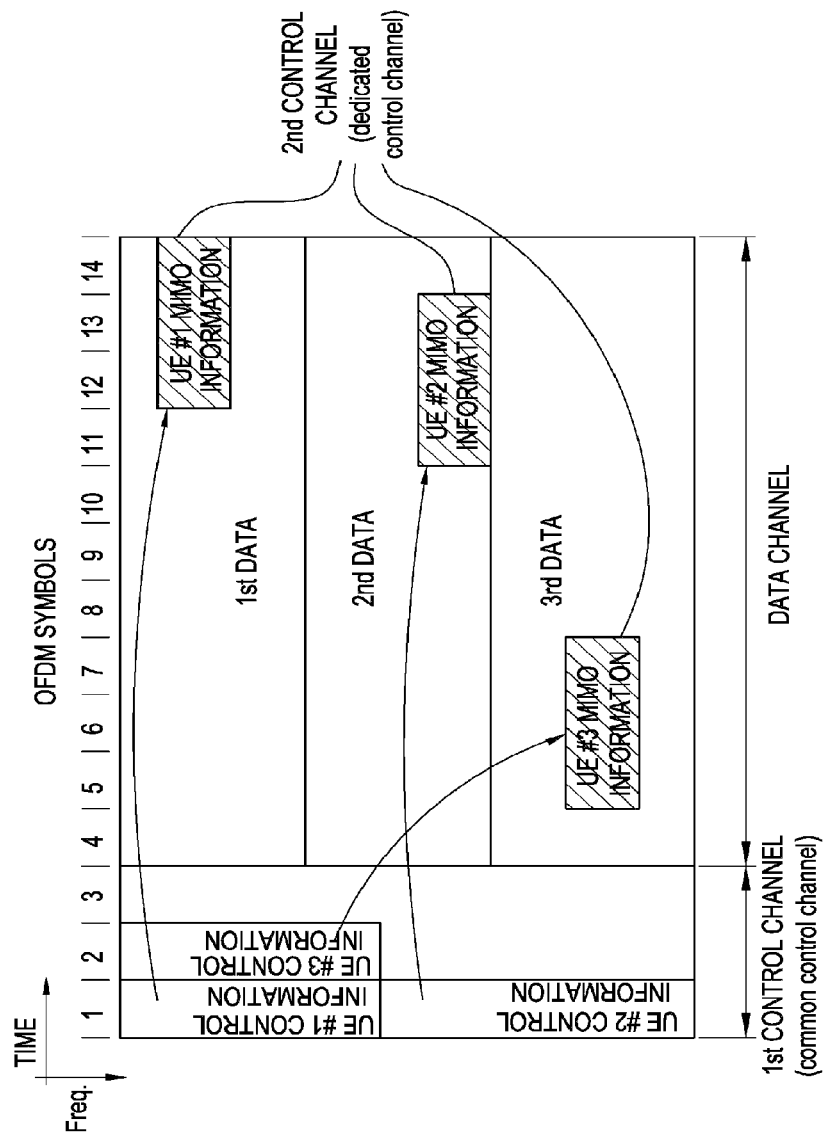
FIG. 5 is a view showing a sub-frame according to another embodiment of the invention.

FIG. 5 is a view showing a sub-frame according to another embodiment of the invention. It is a case where a portion of the data region assigned to each user equipment is assigned as a dedicated control channel.

Referring to FIG. 5, the second control channel (dedicated control channel) may be placed in each data region assigned to each user equipment. That is, a portion or all of MIMO information may be placed in a corresponding data region assigned to a user equipment. For example, MIMO information of a first user equipment is placed in a first data region assigned to the first user equipment, MIMO information of a second user equipment is placed in a second data region assigned to the second user equipment, and MIMO information of a third user equipment is placed in a third data region assigned to the third user equipment. At this point, information on existence, location, size and the like of MIMO information placed in the data region may be contained in the control information of the first control channel. For example, information on the starting point of MIMO information of the first user equipment is contained in the control information of the first user equipment, information on the starting point of MIMO information of the second user equipment is contained in the control information of the second user equipment, and information on the starting point of MIMO information of the third user equipment is contained in the control information of the third user equipment. The user equipments may understand the MIMO information on the second control channel through the control information on the first control channel.

Figure 6:
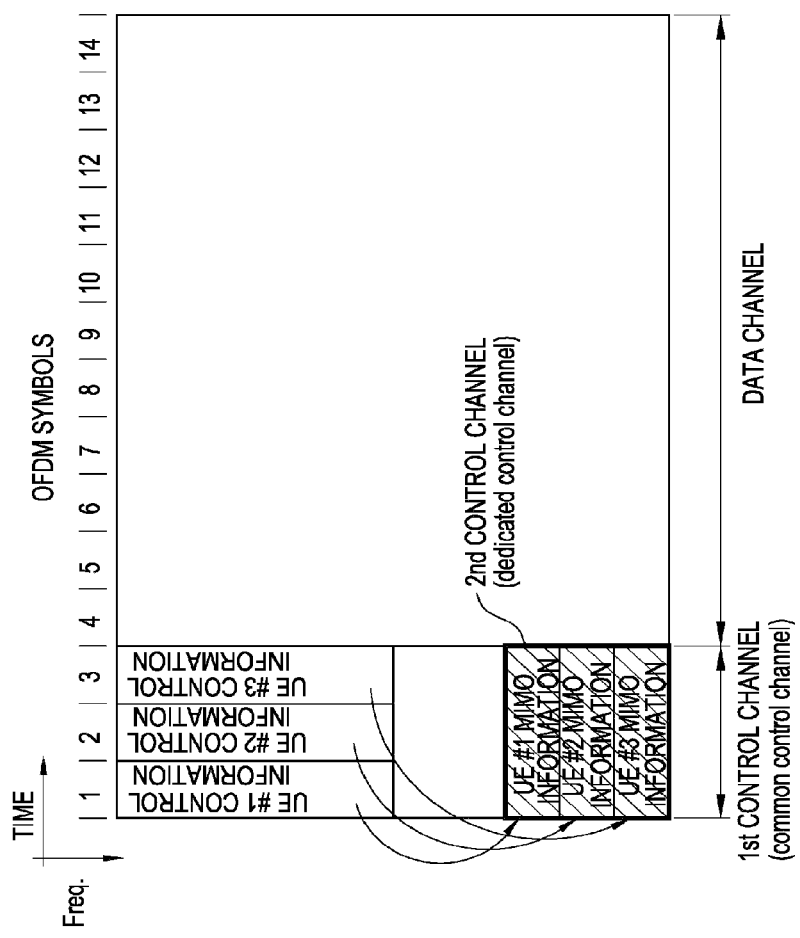
FIG. 6 is a view showing a sub-frame according to still another embodiment of the invention.

FIG. 6 is a view showing a sub-frame according to still another embodiment of the invention. It is a case where a portion of the frequency band of the common control channel is assigned as a dedicated control channel.

Referring to FIG. 6, the second control channel (dedicated control channel) may be placed in a portion of the frequency band of the first control channel (common control channel). Information on existence, location, size and the like of MIMO information loaded on the second control channel may be contained in the control information of the first control channel. For example, if it is assumed that control information of user equipments #1, #2, and #3 is loaded on the first control channel, and MIMO information of user equipments #1, #2, and #3 is loaded on the second control channel, information on the starting point of the MIMO information of the first user equipment is contained in the control information of the first user equipment, information on the starting point of the MIMO information of the second user equipment is contained in the control information of the second user equipment, and information on the starting point of the MIMO information of the third user equipment is contained in the control information of the third user equipment. The user equipments may understand the MIMO information on the second control channel through the control information on the first control channel.

Figure 7:
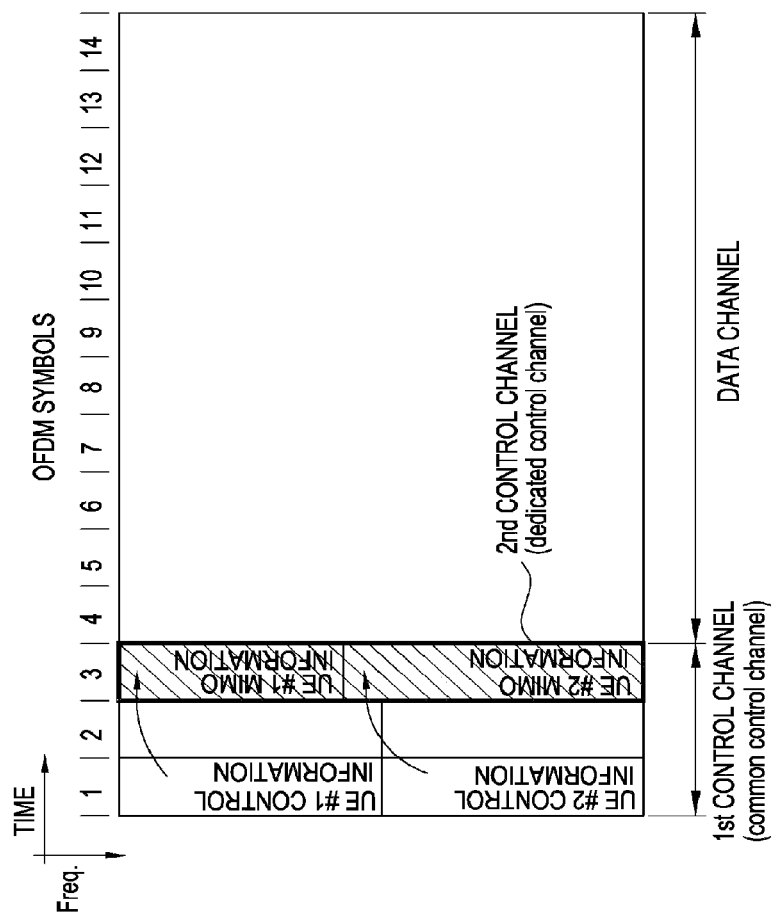
FIG. 7 is a view showing a sub-frame according to still another embodiment of the invention.

FIG. 7 is a view showing a sub-frame according to still another embodiment of the invention. It is a case where some of OFDM symbols in a sub-frame are assigned as a dedicated control channel.

Referring to FIG. 7, the second control channel (dedicated control channel) may be placed in some of OFDM symbols of the first control channel (common control channel). For example, two OFDM symbols from a first to second OFDM symbols of a sub-frame are assigned as a first control channel, a third OFDM symbol is assigned as a second control channel, and the other eleven OFDM symbols from a fourth to fourteenth OFDM symbol are assigned as a data channel. If it is assumed that control information of user equipments #1 and #2 is loaded on the first control channel and MIMO information of user equipments #1 and #2 is loaded on the second control channel, information on existence, location, size and the like of the MIMO information of user equipment #1 may be contained in the common control information of the user equipments #1, and information on existence, location, size and the like of the MIMO information of user equipment #2 may be contained in the common control information of the user equipments #2. The user equipments may understand the MIMO information on the second control channel through the control information on the first control channel.

Figure 8:
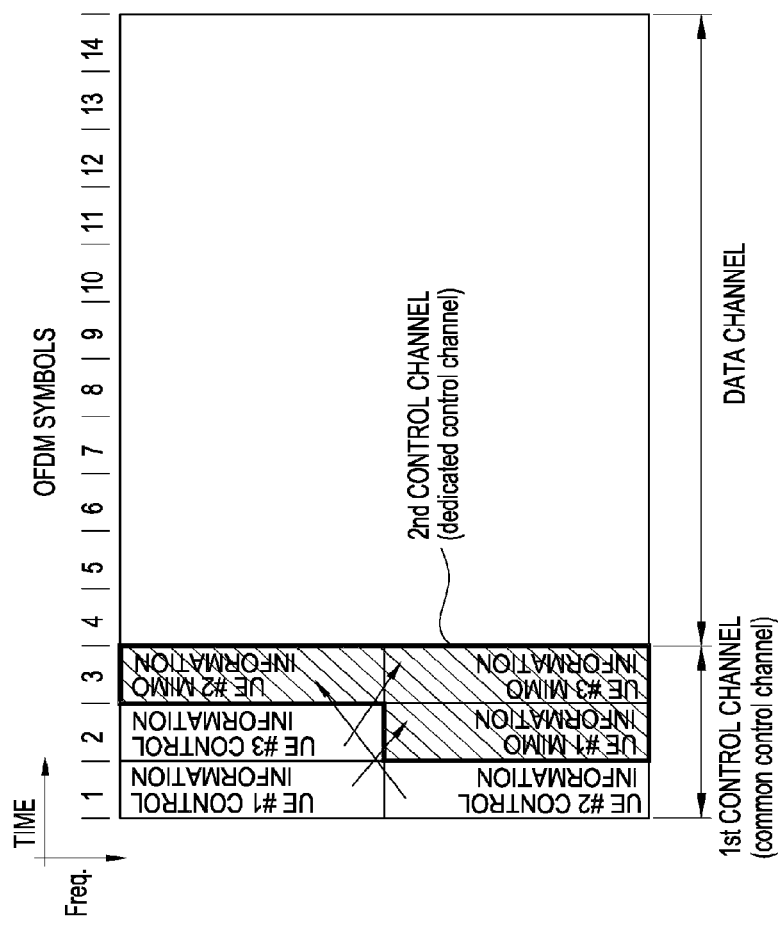
FIG. 8 is a view showing a sub-frame according to still another embodiment of the invention.

FIG. 8 is a view showing a sub-frame according to still another embodiment of the invention. It is a case where the control channel is prepared as a region for transmitting N pieces of control information.

Referring to FIG. 8, the control channel may be previously divided into N regions to transmit control information of user equipments. Control information for one user equipment is assigned to each region. At this point, practically, M (<N) user equipments may use the control channel. When M user equipments use the control channel, (N-M) regions are unused. Although the sub-frame may be transmitted with the (N-M) empty regions, this is waste of radio resources.

MIMO information may be assigned to the (N-M) empty regions that are prepared to transmit control information. For example, the control channel may be prepared as regions for transmitting control information of six user equipments. When three user equipments actually use the control channel, three regions are left empty. MIMO information of each user equipment is assigned to the three empty regions. That is, in the control channel, control information of a first user equipment is assigned to a first region, control information of a second user equipment is assigned to a second region, and control information of a third user equipment is assigned to a third region. A fourth to sixth regions of the control channel are empty, and thus MIMO information of the first user equipment is assigned to the fourth region, MIMO information of the second user equipment is assigned to the fifth region, and MIMO information of the third user equipment is assigned to the sixth region. At this point, information on the location of the MIMO information of the first user equipment is contained in the control information of the first user equipment, information on the location of the MIMO information of the second user equipment is contained in the control information of the second user equipment, and information on the location of the MIMO information of the third user equipment is contained in the control information of the third user equipment.

If the control channel is previously divided into N regions to transmit control information, MIMO information is assigned to empty spaces to which control information is not assigned. In the empty spaces to which control information is not assigned, pilot signals, channel information signals, and the like may be assigned, as well as MIMO information.

The division of the control channel and the data channel shown in FIGS. 4 to 8 is merely an example, and the number of OFDM symbols, frequency band, and locations of channels in the control channel and the data channel are not restricted thereto. The number of OFDM symbols, frequency band, and locations of channels assigned to the control channel and the data channel may be diversely determined. In addition, control information loaded on the first control channel and the second control channel may be diversely determined. For example, broadcast control information decoded by all user equipments and multicast control information decoded by a group of specific user equipments may be loaded on the first control channel, and unicast control information decoded by a specific user equipment may be loaded on the second control channel. Alternatively, broadcast control information, multicast control information, and unicast control information may be loaded on the first control channel, and a portion of unicast control information may be loaded on the second control channel. The format and type of control information loaded on the first and second control channels may be diversely modified depending on communication environments, and the base station may transmit the format and type of control information to the downlink.

v) Channel Estimation of Control Information

Hereinafter, channel estimation of control information transmitted through the second control channel will be described based on an applied transmission technique. In a MIMO system, the base station may transmit control information by applying a variety of techniques such as spatial diversity, beamforming, spatial multiplexing, and the like. A user equipment estimates a channel through a common reference signal and may detect the transmitted control information on the first or second control channel based on the estimated channel. Alternatively, the user equipment may detect the transmitted control information by comparing receive signals and transmit signals. Then, the user equipment may estimate the channel condition of the second control channel after removing the control information from the second control channel. The user equipment may estimate channel conditions of each transmit antenna or estimate an equivalent channel based on a transmission technique.

First, a signal transmitted in a rank-1 precoding and a beamforming technique is described.

A user equipment estimates a channel and control information based on a weight transmitted from the base station. A receive signal can be represented as MathFigure 1

$$Y = HWS + N \qquad \text{[Math.1]}$$

where Y denotes a receive signal, H denotes a channel, W denotes a weight vector, S denotes control information, and N denotes a noise. The weight vector W may be a weight of rank-1 precoding or a vector of a precoding matrix used in two or more ranks. One of weights defined in a weight set may be selected to be used as the weight vector W, or the weight vector W may be a weight generated by beamforming. The control information S means control information transmitted through the second control channel.

Control information transmitted through the second control channel may be contained in a resource block or in a plurality of resource blocks among the entire resource blocks. Transmit and receive of control information through the second control channel is referred to as dedicated signaling. When the dedicated signaling is performed through a plurality of resource blocks, a different or the same weight may be applied to each of the resource blocks.

For example, a PMI is transmitted through the second control channel, and the second control channel is included in three resource blocks. In order to decode a signal on the data channel applied with a precoding weight, the applied weight should be obtained. Weight information may be transmitted through the first or second control channel. The user equipment may be assigned with a plurality of resource blocks, and different weights may be applied to the resource blocks depending on channel condition. All of individual weights may not be informed, but only one weight may be informed through the first control channel. At this point, a weight loaded on the first control channel may represent a weight of all resource blocks. That is, the weight loaded on the first control channel may be an average weight or a representative weight of all resource blocks. For example, when dedicated signaling is performed in one resource block or all resource blocks use the same weight, the weight of the resource block containing the dedicated signaling or a weight of all resource blocks is informed through the first control channel. Weights applied to other resource blocks may be included in the dedicated signaling, and weight information applied to other resource blocks may not be included if the same weight is applied to all resource blocks. Since only one weight is loaded on the first control channel, resources for informing a plurality of weights do not need to be assigned. In this case, the second control channel is transmitted using precoding, error probability can be improved. Since weight information is fixedly transmitted through the first control channel, the first control channel may have a fixed size or a few fixed sizes, and thus it is advantageous in designing the first control channel.

Alternatively, the weight loaded on the first control channel may represent a weight of a specific resource block. When dedicated signaling is transmitted through a plurality of resource blocks, the weight loaded on the first control channel may represent the weight of the first resource block. The dedicated signaling of a first resource block informs of the weight of a second resource block, and the dedicated signaling of the second resource block informs of the weight of a third resource block. Here, the aspect of using the same pilot in TDD and beamforming when transmitting a weight may not be satisfied.

On the other hand, when a transmit signal is precoded with a weight used in the resource block to which the second control channel is belonged, a receive signal can be expressed as MathFigure 2

$$Y = HW_i S_{i,k} + N \quad \text{[Math.2]}$$

where Y denotes a receive signal, H denotes a channel, and N denotes a noise. $W_i$ denotes the weight of the i-th codebook of a set of n codebooks, and $S_i$ denotes a sequence of an index representing the weight of the i-th codebook mapped to a symbol. The element $S_{i,k}$ constituting $S_i$ is precoded using $W_i$ and transmitted through the second control channel.

A user equipment may estimate the transmitted weight using the known codebook set and sequence. This may be expressed as shown MathFigure 3

$$\operatorname{argmin} \sum_k |Y - H'W_j S_{j,k}|^2 \quad \text{[Math. 3]}$$

$$\operatorname{argmin} \sum_k |(H'W_j)^H Y - S_{j,k}|^2$$

where H' is a channel estimated through a common reference signal. A PMI may be detected by searching for j satisfying the equation 3.

On the other hand, the dedicated control channel transmitted in the precoding technique may be used for channel estimation. The symbol S of the dedicated signaling estimated based on the estimated channel H and reported weight vector W is removed from the receive signal Y. W is a vector, and the transmitted symbol S is a scalar value. As a simple example, an equivalent channel HW, which is a product of channel H by vector W, can be obtained by dividing Y by S.

Channel estimation of a signal transmitted in space-time coding (STC) of a code division multiplex method is described.

The receive signal may be expressed as shown in the equation 2, and a weight applied to two transmit antennas and a symbol for dedicated signaling may be expressed as shown MathFigure 4

$$W_i = \begin{cases} \begin{bmatrix} 1 & 0 & 0 & 0 \\ 0 & 1 & 0 & 0 \end{bmatrix}, i = 0 \\ \begin{bmatrix} 0 & 0 & 0 & -1 \\ 0 & 0 & 1 & 0 \end{bmatrix}, i = 1 \end{cases} \quad \text{[Math. 4]}$$

$$S_{i,k} = \begin{bmatrix} S_{i,k} \\ S_{i,k+1} \\ S_{i,k}^* \\ S_{i,k+1}^* \end{bmatrix}, k = 0, 2, 4, \ldots, K$$

where Wi denotes a weight applied when a signal is transmitted in 2Tx-Alamouti. $S_{i,k}$ denotes a symbol for dedicated signaling, and (.)* denotes a complex conjugate. If bit type control information is transmitted, the control information may be mapped to a complex value in the method described above.

For example, if a PMI of three bits used in the data region is transmitted, the user equipment may understand the PMI of the transmitted data region, to which the PMI is applied, through control information of three bits. The control information of three bits may be coded into a Reed-Muller block code, modulated in QPSK, and transmitted in SFBC method. The user equipment may detect bits of the control information via demodulation and decoding after SFBC decoding. As another detecting method, when the user equipment knows symbols corresponding to the control information of three bits, the user equipment generates symbols equivalent to SFBC transmission, and a symbol having the smallest difference with the receive signal may be considered as transmit signal.

When a weight vector/matrix, PMI, and the like used for precoding are transmitted through the dedicated control channel, the dedicated control channel may transmit all weights or PMIs simultaneously, and control information used in each resource block may be contained in each resource block region to be transmitted.

Channels experienced by dedicated control channels may be estimated for each transmit antenna. For example, when a signal is transmitted in SFBC using two transmit antennas, a receive signal may be expressed as shown MathFigure 5

$$Y = \begin{bmatrix} Y_1 \\ Y_2 \end{bmatrix} = \begin{bmatrix} HS_1 + N_1 \\ HS_2 + N_2 \end{bmatrix} \qquad \text{[Math. 5]}$$

where $H=[H_1 \ H_2]$, $S_1=[S_1 \ S_2]^T$, and $S_2=[-S^*_2 S^*_1]^T$.

A channel of each transmit antenna may be estimated as shown

MathFigure 6

$$H'_1 = Y^T \begin{bmatrix} S^*_1 \\ -S_2 \end{bmatrix} \qquad \text{[Math. 6]}$$

$$H'_2 = Y^T \begin{bmatrix} S^*_2 \\ S_1 \end{bmatrix}$$

where $Y_1$ denotes a receive signal received through a first transmit antenna, $Y_2$ denotes a receive signal received through a second transmit antenna, $(.)^T$ denotes a transposed matrix, and $(.)^*$ denotes a complex conjugate.

Channel estimation of a signal transmitted in a frequency division multiplex method or time division multiplex method is described. When a signal transmitted in Frequency Switched Transmission Diversity (FSTD) or Time Switched Transmission Diversity (TSTD) is expressed as shown in equation 2, weights for two transmit antennas may be expressed as shown MathFigure 7

$$W_i = \begin{cases} \begin{bmatrix} 1 \\ 0 \end{bmatrix}, i = 0 \\ \begin{bmatrix} 0 \\ 1 \end{bmatrix}, i = 1 \end{cases} \qquad \text{[Math. 7]}$$

where $W_i$ denotes a vector for selecting an antenna based on frequency and time. For example, $W_i$ has two methods for selecting an antenna when signals are transmitted through two transmit antennas. When i=0, a first transmit antenna is selected, whereas when i=1, a second transmit antenna is selected.

Transmission signal Si,k is a scalar of a complex number. The order of $S_{i,k}$ (k=0, . . . , K) may appropriately rearranged so that K sequences may experience the transmit antennas. For example, when two symbols obtained by mapping a PMI of three bits to a complex number are transmitted four times repeatedly, the sequences $S_0$ and $S_1$ of the symbols may be repeated as $S_0$, $S_1$, $S_0$, $S_1$, $S_0$, $S_1$, $S_0$, $S_1$. If the symbols are transmitted in FSTD through two transmit antennas, $S_0$s are always transmitted through a first transmit antenna, and $S_1$s are always transmitted through a second transmit antenna. In this case, it is difficult to expect antenna diversity, and if the sequences are appropriately rearranged as $S_0$, $S_1$, $S_1$, $S_0$, $S_0$, $S_1$, $S_1$, $S_0$, both of the two symbols are transmitted through two transmit antennas, and thus the antenna diversity may be obtained.

In detecting a signal, since signals transmitted in FSTD or TSTD may be regarded as signals transmitted through a single antenna, the channels experienced by the dedicated control channel may be estimated for each transmit antenna. The channels may be estimated for each transmit antenna using a common pilot (reference signal). The signals transmitted through the dedicated control channel may be detected based on the estimated channels. Alternatively, the transmitted signals may be detected based on the estimated channels and a known signal. Alternatively, the transmitted signals may be detected based only on a known signal without using the estimated channels. The channels experienced by the dedicated control channel may be estimated based on the detected signals. When the signals are transmitted in FSTD or TSTD, the channels may be estimated for each transmit antenna. Interpolation and extrapolation may be performed based on the channels of respective antennas estimated using a pilot and the signals transmitted through the dedicated control channel. When dedicated signaling is attempted in this manner, an effect the same as that of transmitting a reference signal in FDM or TDM method may be obtained.

A plurality of resource blocks may be contained in a sub-frame, and MIMO information may be transmitted on a sub-carrier for transmitting MIMO information. The sub-carrier for transmitting MIMO information is referred to as a dedicated pilot. Hereinafter, a method of transmitting MIMO information on the dedicated pilot is described.

vi) Arrangement of Control Information

Figure 9:
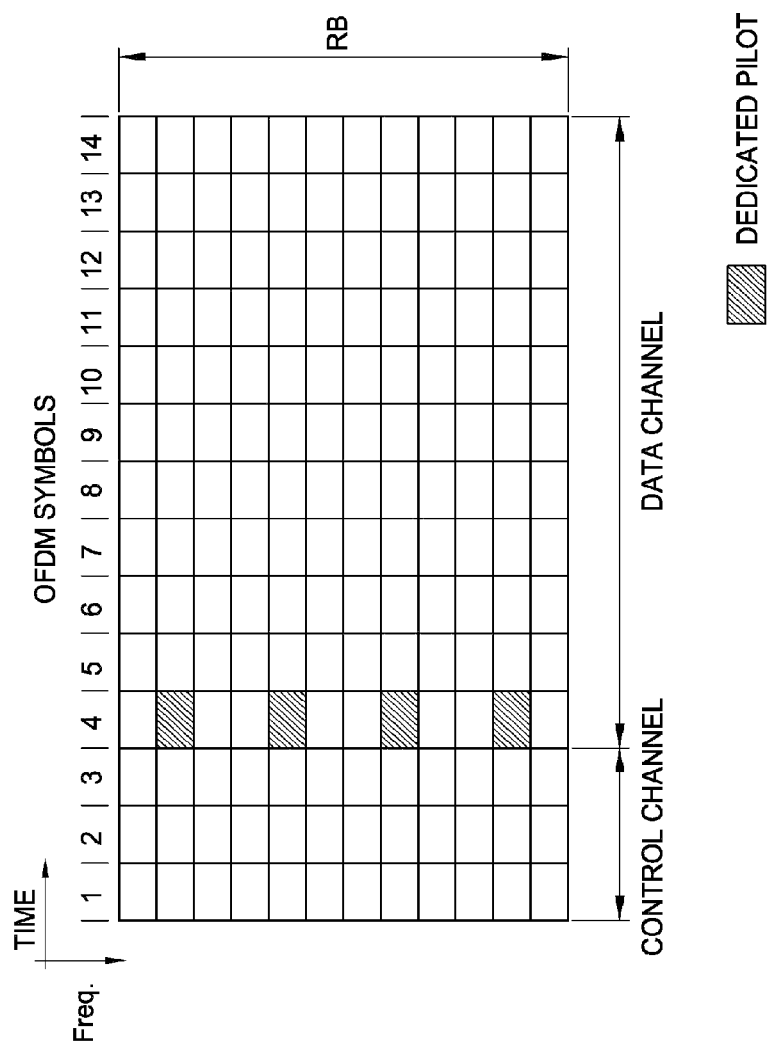
FIG. 9 is a view showing an example of dedicated pilots arranged in a resource block according to another embodiment of the invention.

FIG. 9 is a view showing an example of dedicated pilots arranged in a resource block according to another embodiment of the invention.

Referring to FIG. 9, a resource block is a basic unit of radio resources assigned to a user equipment. The resource block may be referred to as a sub-band, sub-channel, resource tile, bin, or the like. A plurality of sub-carriers is assigned to the resource block. Some of sub-carriers may be used as dedicated pilots for transmitting MIMO information. A plurality of dedicated pilots may become a dedicated control channel. That is, the dedicated control channel may comprise a plurality of dedicated pilots.

It is assumed that the control channel comprises a first to third OFDM symbols, and the data channel comprises a fourth to fourteenth OFDM symbols. The resource block may be divided into a plurality of frequency bands, and a sub-carrier is allocated in each frequency band by the unit of a symbol. Control information is transmitted on each sub-carrier of the control channel, and data is transmitted on each sub-carrier of the data channel. MIMO information may be transmitted on dedicated pilots. For example, four dedicated pilots are arranged in the fourth OFDM symbol at regular intervals to express MIMO information. Of course, the dedicated pilots may be arranged in sub-carriers of the first to third OFDM symbols corresponding to the control channel.

Figure 10:
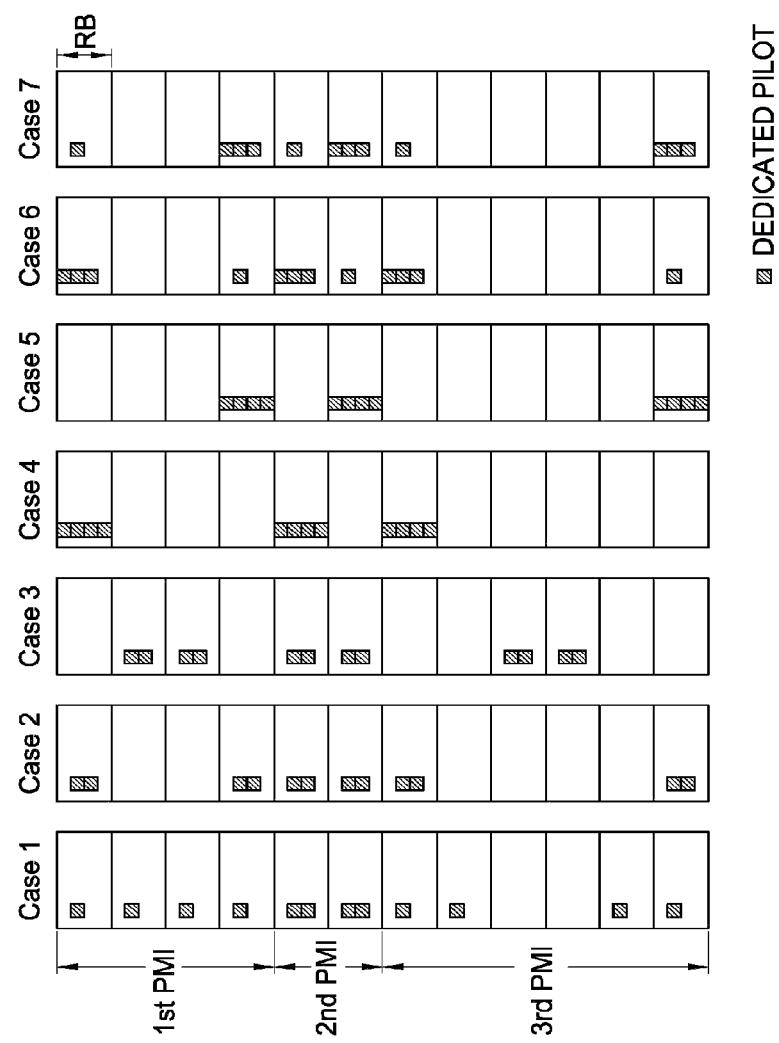
FIG. 10 is a view showing an example of dedicated pilots arranged in a system frequency band according to an embodiment of the invention.

FIG. 10 is a view showing an example of dedicated pilots arranged in a system frequency band according to an embodiment of the invention. This is a case assuming that the dedicated pilots are not limited to one user equipment.

Referring to FIG. 10, a system frequency band comprises a plurality of resource blocks. Dedicated pilots representing MIMO information may be distributed in a plurality of resource blocks. At this point, the dedicated pilots are distributed within a range of resource blocks to which the same PMI is applied. A precoding matrix is a weight matrix for applying a weight depending on channel condition, and the same PMI may be applied to resource blocks whose channel conditions are the same. Accordingly, there may be a range in which the same PMI is applied to a plurality of neighboring resource blocks. A range to which the same PMI is applied may contain one or more resource blocks.

Regions allocated for dedicated control channels may be fixedly punctured within resource blocks. When a data region is punctured to transmit a dedicated control channel, the data region is punctured considering detection performance of the dedicated control and channel estimation performance. If dedicated control channels are assigned at the same size in all resource blocks, a transmission rate is adjusted depending on the amount of dedicated signaling to be transmitted, or assigned portions may not be used.

Hereinafter, it is assumed that a system frequency band is divided into a first to third PMIs as shown in FIG. 10. The same PMI is applied to resource blocks belonging to the first PMI. The same PMI different from the first PMI is applied to resource blocks belonging to the second PMI, and the same PMI different from the first and second PMIs is applied to resource blocks belonging to the third PMI. A range to which the same PMI is applied is referred to as a PMI granularity. It is assumed that four dedicated pilots are arranged in one PMI granularity. The base station may obtain and transmit multiple antenna information by the range to which the same PMI is applied. The base station may transmit multiple antenna information by the range to which the same PMI is applied through the dedicated control channels or dedicated pilots.

In case 1, dedicated pilots are maximally distributed in resource blocks within a range to which the same PMI is applied. If the number of dedicated pilots is larger than the number of resource blocks, one or more dedicated pilots are arranged in a resource block, and if the number of dedicated pilots is smaller than the number of resource blocks, there exist resource blocks in which no dedicated pilot is arranged. One dedicated pilot is arranged in each of four resource blocks belonging to the first PMI. Two dedicated pilots are arranged in each of two resource blocks belonging to the second PMI. One dedicated pilot is arranged in each of four resource blocks among six resource blocks belonging to the third PMI, and no dedicated pilot is arranged in the remaining two resource blocks.

In cases 2 and 3, two dedicated pilots are arranged in each of two resource blocks within a range to which the same PMI is applied. In case 2, two resource blocks respectively assigned with a dedicated pilot are placed at both ends of a range in which the same PMI is applied. In case 3, two resource blocks respectively assigned with a dedicated pilot are placed at the center of a range to which the same PMI is applied.

In cases 4 and 5, dedicated pilots are arranged in one resource block within a range to which the same PMI is applied. That is, within a range to which the same PMI is applied, four dedicated pilots are arranged in one resource block, and no dedicated pilot is arranged in the other resource blocks. In case 4, the resource block in which dedicated pilots are arranged is placed at one end of a range to which the same PMI is applied. In case 5, the resource block in which dedicated pilots are arranged is placed at the other end of a range to which the same PMI is applied.

In cases 6 and 7, one dedicated pilot is arranged in one resource block and three dedicated pilots are arranged in another resource block within a range to which the same PMI is applied. In case 6, one resource block in which one dedicated pilot is arranged and the other resource block in which three dedicated pilot are arranged are placed at both ends of a range to which the same PMI is applied. In case 7, one resource block in which one dedicated pilot is arranged and the other resource block in which three dedicated pilot are arranged are placed at the opposite positions of case 6.

Figure 11:
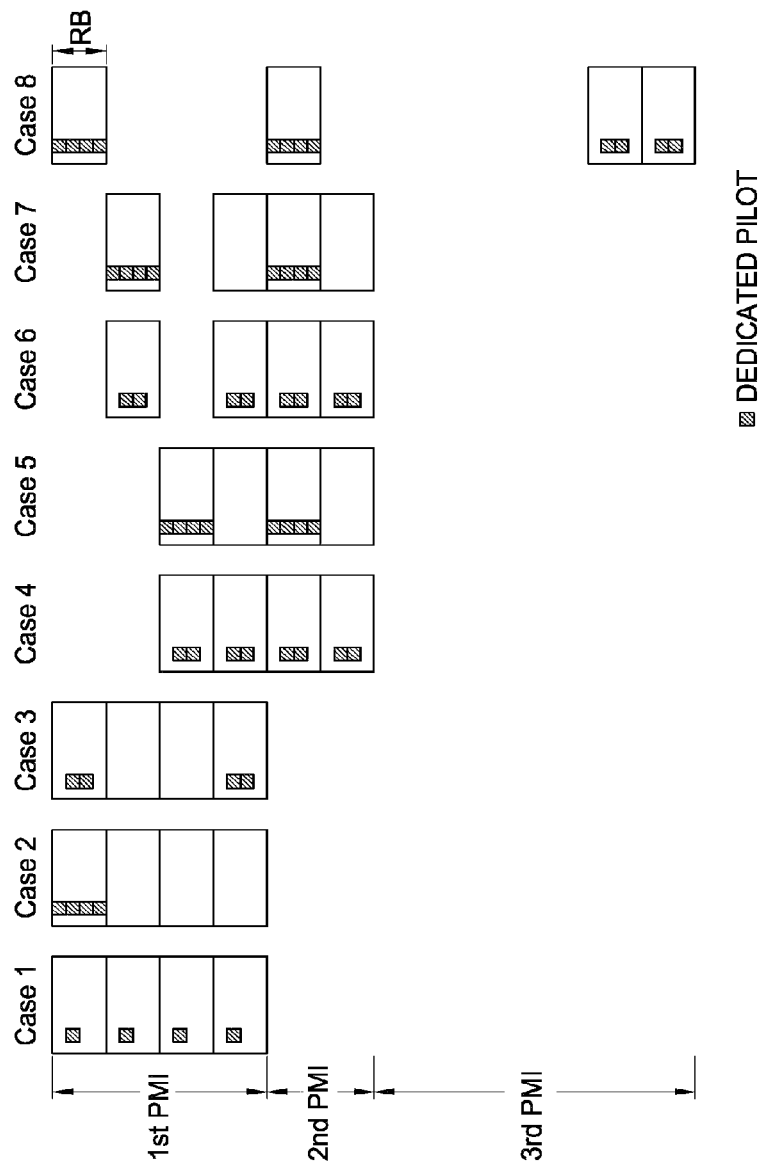
FIG. 11 is a view showing an example of dedicated pilots arranged in a system frequency band according to another embodiment of the invention.

FIG. 11 is a view showing an example of dedicated pilots arranged in a system frequency band according to another embodiment of the invention. This is a case assuming that the dedicated pilots are limited to a user equipment.

Referring to FIG. 11, MIMO information may be unicast control information limited to one equipment. The MIMO information may be contained in data for a corresponding user equipment to be transmitted. The unicast control information and/or the data for a user equipment may be distributed in a plurality of resource blocks. The plurality of resource blocks may be contained within a range to which the same PMI is applied, or may not be contained within a range to which the same PMI is applied.

It is assumed that a system frequency band is divided into a first to third PMIs, the unicast control information and/or the data for a user equipment is assigned to four resource blocks, and four dedicated pilots represent one piece of MIMO information.

In cases 1 to 3, all resource blocks assigned to the user equipment are contained within a range to which the same PMI is applied. In case 1, the dedicated pilots are distributed in four resource blocks, and one bit is allocated to each resource block. In case 2, the dedicated pilots are arranged in one resource block among the four resource blocks, and four bits are allocated to the resource block. In case 3, the dedicated pilots are arranged in two resource blocks, and two bits are allocated to each of the two resource blocks. It is also possible that one dedicated pilot is arranged in one resource block and three dedicated pilots are arranged in the other resource block.

In cases 4 and 5, resource blocks assigned to the user equipment are contained in two contiguous and neighboring PMI granularities to which two different PMIs are applied. At this point, eight dedicated pilots are arranged in the entire resource blocks assigned to the user equipment. In case 4, two dedicated pilots are arranged in each of two resource blocks belonging to a first PMI, and two dedicated pilots are arranged in each of two resource blocks belonging to a second PMI. In case 5, four bit of four dedicated pilots are arranged in a resource block among two resource blocks belonging to the first PMI, and four bit of four dedicated pilots are arranged in a resource block among two resource blocks belonging to the second PMI. Four dedicated pilots are arranged in each range to which the same PMI is applied.

In cases 6 and 7, resource blocks assigned to the user equipment are contained in two non-contiguous but neighboring PMI granularities to which two different PMIs are applied. At this point, eight dedicated pilots are arranged in the entire resource blocks assigned to the user equipment. In case 6, two dedicated pilots are arranged in each of two resource blocks belonging to a first PMI, and two dedicated pilots are arranged in each of two resource blocks belonging to a second PMI. In case 7, four dedicated pilots are arranged in a resource block among two resource blocks belonging to the first PMI, and four dedicated pilots are arranged in a resource block among two resource blocks belonging to the second PMI. Four bits for the four dedicated pilots are allocated in each range to which the same PMI is applied.

In case 8, resource blocks assigned to the user equipment are contained in three PMI granularities to which three different PMIs are applied. At this point, twelve dedicated pilots are arranged in the entire resource blocks assigned to the user equipment. Four dedicated pilots are arranged in a resource block belonging to the first PMI, four dedicated pilots are arranged in a resource block belonging to the second PMI, and four dedicated pilots are arranged in a resource block belonging to the third PMT. Four dedicated pilots are arranged in each range to which the same PMI is applied.

As described, regardless of the number of resource blocks belonging to a range to which the same PMI is applied, the number of dedicated pilots is constant within a range to which the same PMI is applied. A constant number of dedicated pilots are arranged within a range to which the same PMI is applied. Therefore, compared with a case where dedicated pilots are allocated and transmitted for each resource block, overheads incurred by a control signal may be reduced, and radio resources for allocating data can be secured further more.

The arrangements of dedicated pilots as shown in FIGS. 10 and 11 are merely examples, and it is not limited thereto. The dedicated pilot may be configured to be one or more. A range to which the same PMI is applied may be one or divided into a plurality, which may be changed depending on channel conditions. In addition, the number of resource blocks belonging to a range to which the same PMI is applied may be configured to be one or more, which may be changed depending on channel conditions. Arrangement of dedicated pilots within a range to which the same PMI is applied may be modified from the present invention and embodied in apparent and diverse ways.

Figure 12:
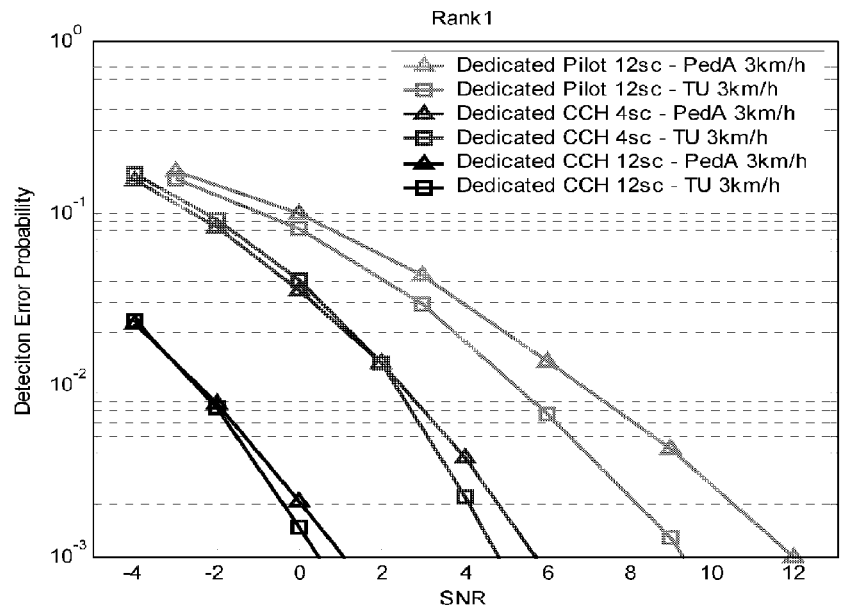
FIG. 12 is a graph showing detection error probability (DEP) for transmission of PMI when a rank is 1.

FIG. 12 is a graph showing detection error probability (DEP) for transmission of PMI when a rank is 1.

Referring to FIG. 12, compared are DEPs obtained from a case where twelve sub-carriers are used as dedicated pilots in a resource block to transmit PMIs (Dedicated pilot 12sc), a case where four sub-carriers are used as dedicated control channels (Dedicated CCH 4sc), and a case where twelve sub-carriers are used as dedicated control channels (Dedicated CCH 12sc). The channel model is a pedestrian model (Peda) of 3 km/h and 6-ray TU (transmission unit) 3 km/h.

DEPs obtained from the methods using dedicated control channels are lower than that obtained from the method using dedicated pilots. That is, the methods using dedicated control channels are superior to the method using dedicated control pilots in performance of detecting PMIs. In addition, as the number of sub-carriers used in a dedicated control channel increases, the performance is enhanced.

Figure 13:
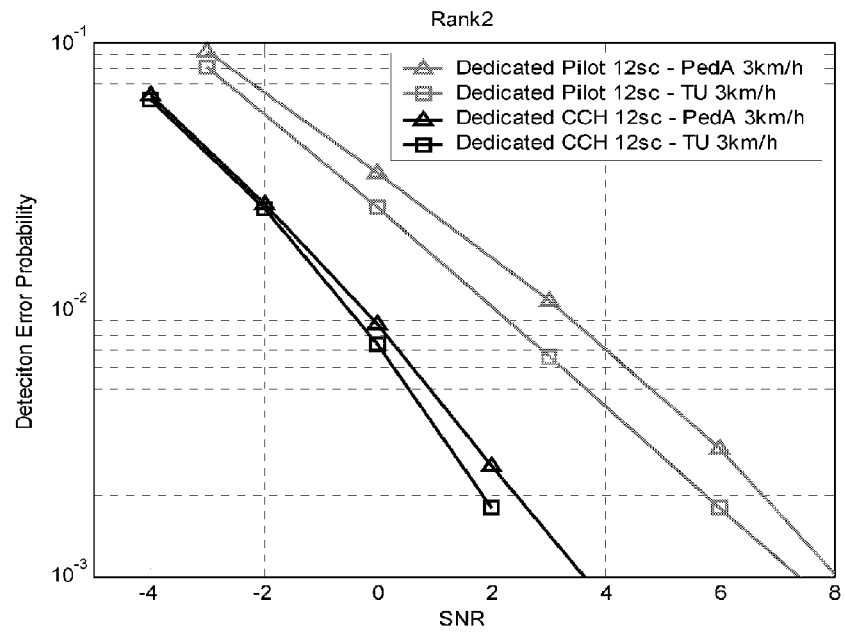
FIG. 13 is a graph showing detection error probability (DEP) for transmission of PMI when a rank is 2.

FIG. 13 is a graph showing detection error probability (DEP) for transmission of PMI when a rank is 2.

Referring to FIG. 13, compared are DEPs obtained from a case where twelve sub-carriers are used as dedicated pilots in a resource block to transmit PMIs (Dedicated pilot 12sc) and a case where twelve sub-carriers are used as dedicated control channels (Dedicated CCH 12sc) when the rank is 2. The method using dedicated control channels is superior to the method using dedicated control pilots in performance of detecting PMIs. That is, regardless of the rank, although there is no additional sub-carrier, the method using dedicated control channels is superior to the method using dedicated control pilots in performance of detecting PMIs.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for multiple input multiple output (MIMO) transmission in a wireless communication system, the method performed by a transmitter and comprising:
encoding a first control signal by using a convolutional coding to generate an encoded first control signal, the first control signal including common control information that is common to all receivers;
encoding at least one second control signal by using the convolutional coding to generate at least one encoded second control signal, the at least one second control signal including user-specific MIMO information;
transmitting the encoded first control signal to at least one receiver;
transmitting the at least one encoded second control signal to the at least one receiver via at least one spatial stream; and
transmitting at least one data packet to the at least one receiver,
wherein the common control information includes MIMO information indicating whether the at least one encoded second control signal is to be transmitted by a single-user MIMO scheme or by using a multi-user MIMO scheme,
wherein the user-specific MIMO information includes information that is used to decode the at least one data packet by the at least one receiver, and
wherein the at least one encoded second control signal is transmitted by applying a precoding that is specific to a corresponding receiver but the encoded first control signal is transmitted without applying any precoding.

2. The method of claim 1, wherein the common control information further includes a resource assignment that indicates a frequency band in which the at least one encoded second control signal is to be transmitted.

3. The method of claim 1, wherein the common control information further includes position information that indicates the at least one spatial stream through which the at least one encoded second control signal is to be transmitted.

4. The method of claim 1, wherein the first control signal and the at least one second control signal are convolutionally encoded at a rate of ½.

5. The method of claim 1, wherein the user-specific MIMO information includes a modulation and coding scheme for the at least one data packet.

6. The method of claim 1, wherein the common control information further includes a MIMO mode indicating whether a space time block code (STBC) is applied.

7. A device for multiple input multiple output (MIMO) transmission in a wireless communication system, the device comprising:
a processor; and
a memory operatively coupled to the processor and storing instructions that are executed by the processor to cause the device to:
encode a first control signal by using a convolutional coding to generate an encoded first control signal, the first control signal including common control information that is common to all receivers;

encode at least one second control signal by using the convolutional coding to generate at least one encoded second control signal, the at least one second control signal including user-specific MIMO information;

transmit the encoded first control signal to at least one receiver;

transmit the at least one encoded second control signal to the at least one receiver via at least one spatial stream; and transmit at least one data packet to the at least one receiver, wherein the common control information includes MIMO information indicating whether the at least one encoded second control signal is to be transmitted by a single-user MIMO scheme or by using a multi-user MIMO scheme, wherein the user-specific MIMO information includes information that is used to decode the at least one data packet by the at least one receiver, and wherein the at least one encoded second control signal is transmitted by applying a precoding that is specific to a corresponding receiver but the encoded first control signal is transmitted without applying any precoding.

8. The device of claim 7, wherein the common control information further includes a resource assignment that indicates a frequency band in which the at least one encoded second control signal is to be transmitted.

9. The device of claim 7, wherein the common control information further includes position information that indicates the at least one spatial stream through which the at least one encoded second control signal is to be transmitted.

10. The device of claim 7, wherein the first control signal and the at least one second control signal are convolutionally encoded at a rate of ½.

11. The device of claim 7, wherein the user-specific MIMO information includes a modulation and coding scheme for the at least one data packet.

12. The device of claim 7, wherein the common control information further includes a MIMO mode indicating whether a space time block code (STBC) is applied.

13. A method for a wireless communication system, the method performed by a receiver comprising:

decoding a first control signal, received from a transmitter, by using a convolutional coding, the first control signal including common control information that is common to all receivers;

decoding a second control signal, received from the transmitter, by using the convolutional coding, the second control signal including user-specific MIMO information;

wherein the common control information includes multiple input multiple output (MIMO) information indicating whether the second control signal is to be received by a single-user MIMO scheme or by using a multi-user MIMO scheme, wherein the user-specific MIMO information includes information that is used to decode a data packet received from the transmitter, and wherein the received second control signal has a precoding applied by the transmitter that is specific to the receiver but the received first control signal has no precoding applied thereto by the transmitter.

14. The method of claim 13, wherein the common control information further includes a resource assignment that indicates a frequency band in which the second control signal is to be received.

15. The method of claim 13, wherein the common control information further includes position information that indicates at least one spatial stream through which the second control signal is to be received.

16. A device for a wireless communication system, the device comprising:

a processor; and a memory operatively coupled to the processor and storing instructions that are executed by the processor to cause the device to:

decode a first control signal, received from a transmitter, by using a convolutional coding, the first control signal including common control information that is common to all receivers;

decode a second control signal, received from the transmitter, by using the convolutional coding, the second control signal including user-specific MIMO information;

wherein the common control information includes multiple input multiple output (MIMO) information indicating whether the second control signal is to be received by a single-user MIMO scheme or by using a multi-user MIMO scheme, wherein the user-specific MIMO information includes information that is used to decode a data packet received from the transmitter, and wherein the received second control signal has a precoding applied by the transmitter that is specific to the receiver but the received first control signal has no precoding applied thereto by the transmitter.

17. The device of claim 16, wherein the common control information further includes a resource assignment that indicates a frequency band in which the second control signal is to be received.

18. The device of claim 16, wherein the common control information further includes position information that indicates at least one spatial stream through which the second control signal is to be received.

* * * * *